July 6, 1926.  
E. RÖNTGEN  
BOX OR THE LIKE  
Filed July 29, 1924
1,591,862
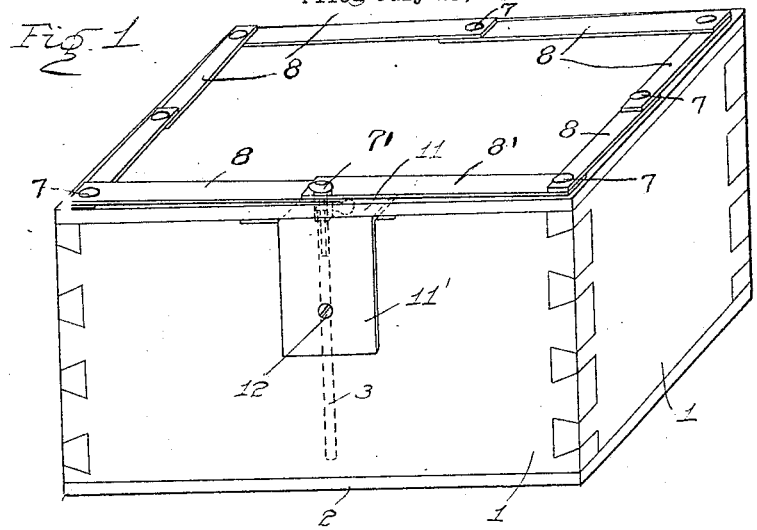
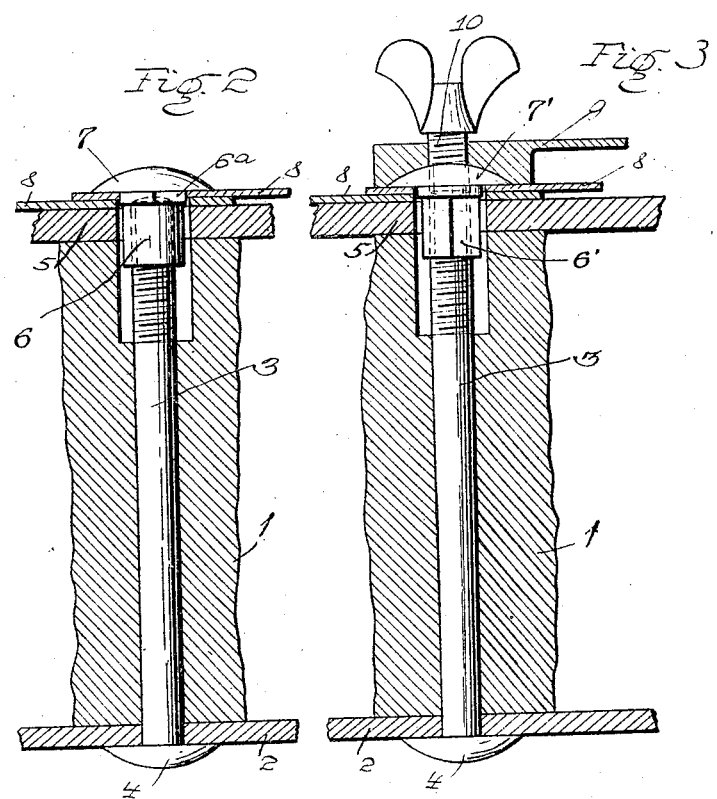
INVENTOR  
E. Röntgen  
BY  
Marks & Clerk  
ATTORNEYS Patented July 6, 1926.

1,591,862

UNITED STATES PATENT OFFICE.

ERNST RÖNTGEN, OF TURMITZ, CZECHOSLOVAKIA.

BOX OR THE LIKE.

Application filed July 29, 1924, Serial No. 728,971, and in Czechoslovakia August 10, 1923.

This invention relates to a nailless closure for boxes and the like. A box closed according to the invention is shown in Figure 1 of the accompanying drawing.

Figures 2 and 3 are detail views.

The walls 1 are tenoned together or rigidly connected together in some other suitable manner. In the bore holes or in grooves open inwards of the said walls are arranged several bolts 3 provided with screw-thread at the upper end, and with round heads 4 at their lower ends passing through the bottom 2, the box resting on the said heads. One bolt 3 is provided in each corner, and one or more in each wall of the box.

The cover or lid 5 has bore holes which are concentric with the bolts 3 and have a larger inside diameter so that the nuts 6 provided with round heads 7 and intended to be screwed on the bolts 3 can be introduced into the said holes in a loosely rotatable manner. One of the said nuts—$6^1$—is made of prismatic shape outside, and its tapped hole is carried right through the round head $7^1$ (Figure 3). The other nuts 6 have merely a prismatic projection or boss $6^a$ under the round head, but for the rest may be made cylindrical. The tapped hole is not carried through the round head 7.

Another part of the closing device is constituted by a number of flat metal strips, for instance strips 8, the respective ends of each of which are provided with openings the diameter of which corresponds to the diameter of the bolts 3 while the number of the strips correspond with the number of the bolts employed. On one of the said metal strips—$8^1$—both openings are round or so dimensioned that the nuts 6, $6^1$ can loosely rotate in them; on each of the other metal strips one opening is round, whilst the other opening is square or polygonal to suit exactly the shape of the boss $6^a$.

The closing of the boxes is effected according to the invention in the following manner: First the strip $8^1$ is placed in its position on the edge of the cover put on the box. One of the nuts 6, 7 is thereupon introduced into the angular opening of one of the strips 8, in such a manner that it is mounted in a non-rotatable manner owing to the projection or boss $6^a$, in the opening in question, and the nut 6, 7 is screwed on the bolt 3, the strip 8 being utilized as a lever. The strip 8 is brought into the position of "rest" in which its round opening is concentric with the next bolt 3. The next nut 6, 7 is then first introduced through the angular opening of the next strip 8 and then through the round opening of the strip 8 which is already adhering to the end of the cover, and the nut is screwed on in the same way by means of the strip 8. The same proceeding is followed until a frame of overlapping metal strips is produced along the whole upper edge of the cover.

The end piece of the closing device is constituted by the nut $7^1$. To enable the same to be screwed in, a spanner 9 made to fit exactly its outline, is placed on its round head 7 and pressed by means of a screw bolt 10 provided with a thumb nut. When the nut $6^1$, $7^1$ has been sufficiently tightened, the bolt 10 and the spanner 9 are removed.

The closing device can be opened only by means of a spanner fitting exactly the head $7^1$; an additional security against opening could be provided by a slide 11 which has a recess constituted by a narrower and a wider portion, with which engages the nut $6^1$ or the bolt 3. The slide 11 is adjustable at right angles to the axis of the bolt 3 in the wall of the box, it is extended outwards and turned over the edge of the wall of the box, so that its part $11^1$ bent at a right angle forms an inscription tablet and can be secured by means of a screw 12 or the like. By moving the plate 11, $11^1$ in such a manner as to bring the angular nut $6^1$ into the narrower portion of the recess, the nut will be prevented from turning, and in that way the whole closing device additionally protected from opening.

I claim:—

1. A nailless closure for covered boxes and the like, comprising in combination a plurality of elongated headed and threaded bolts extending upwardly through the box from the bottom to the cover, a plurality of headed nuts engaged through the cover with the bolts, a plurality of strips arranged in overlapping relation and engaged by the nuts, one of the nuts being provided with means to facilitate fastening and unfastening of the same, and cooperative means on the nuts and remaining strips whereby opposite portions of the strips may be successively employed to fasten or unfasten the corresponding nuts, substantially as and for the purposes set forth.

2. A device as claimed in claim 1, wherein the main fastening and closure nut is provided adjacent the head with a rounded portion and wherein the upper strip engaged by the same is provided in its respective ends with openings for loose engagement with the said closure nut and the adjacent nut, the remaining strips being provided with a squared opening at one end and a round opening at the other end, and the remaining nuts being provided with squared portions adjacent the head, the squared portions and the squared openings constituting a cooperative engaging means between the strips and the nuts.

3. A nailless closure for covered boxes and the like comprising a plurality of round headed and screw threaded bolts extending upwardly through the box from the bottom to the cover, a plurality of round headed nuts loosely rotatable in the holes in the cover, a plurality of flat metal strips arranged to overlap each other along the entire edge of the cover on its upper face, one of said strips constituting the closing part of the chain and each of the remaining strips being non-rotatably connected to one round headed nut provided at its other end with an opening in which the round headed nut of the adjoining screw bolt can turn loosely, the strip forming the closing part of the strip chain being provided at both ends with openings allowing of a loose rotation of the round headed nuts whereby each single metal strip with the exception of the closing strip can be used as a lever for screwing in a round headed nut before the next round headed nut is introduced through its free opening and screwed on the next screw bolt, and unscrewing the former nut after the latter nut has been removed from the free opening.

4. A closing device as claimed in claim 3, wherein the round headed nut establishing a final closure or opening is loosely fastened in the openings of the adjacent overlapping strips and is provided with means for receiving a special tool so as to facilitate the fastening and unfastening of the same.

5. A closing device as claimed in claim 3, wherein the nut establishing the final closing and fastening is provided in addition to the round head with a hole accessible from the outside and provided with threads extending in the same direction of the bolts with which it is engaged, a spanner adapted to be fitted over the head of the nut, and a thumb-screw adapted to be engaged in the threaded hole in the head for clamping the spanner in such a position to facilitate the fastening and loosening of the said closing nut.

6. A closing device as claimed in claim 3, wherein a round headed nut is employed for establishing the final fastening of the strips and is loosely rotatable in the openings of the adjacent overlapping strips including the closure strip, the said closure nut being provided with a round portion immediately adjacent the head, a squared portion continuing from the round portion, an angle plate fitted on the box and provided with a relatively large opening engaged by the nut and also provided with a slot continuing from the opening whereby subsequent to the final fastening of the closing nut the angle plate may be slid so that the slot will embrace the squared portion of the said nut to prevent rotation thereof, and means for fastening the opposite portion of the angle plate to the box.

In testimony whereof I have signed my name to this specification.

ERNST RÖNTGEN.